United States Patent
Beller et al.

(10) Patent No.: US 10,540,442 B2
(45) Date of Patent: Jan. 21, 2020

(54) EVALUATING TEMPORAL RELEVANCE IN QUESTION ANSWERING

(71) Applicant: International Business Machines Corporation, Armonk, NY (US)

(72) Inventors: Charles E. Beller, Baltimore, MD (US); Paul J. Chase, Jr., Fairfax, VA (US); Richard L. Darden, Leesburg, VA (US); Edward G. Katz, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 15/214,529

(22) Filed: Jul. 20, 2016

(65) Prior Publication Data

US 2018/0025075 A1 Jan. 25, 2018

(51) Int. Cl.
*G06F 17/00* (2019.01)
*G06F 17/27* (2006.01)

(52) U.S. Cl.
CPC .................................. *G06F 17/277* (2013.01)

(58) Field of Classification Search
None
See application file for complete search history.

(56) References Cited

U.S. PATENT DOCUMENTS

| | | | |
|---|---|---|---|
| 8,275,803 B2 | 9/2012 | Brown et al. | |
| 2006/0053000 A1* | 3/2006 | Moldovan | G06F 16/243 704/9 |
| 2007/0136281 A1 | 6/2007 | Li et al. | |
| 2009/0055359 A1 | 2/2009 | Gross | |
| 2009/0287678 A1 | 11/2009 | Brown et al. | |
| 2009/0293011 A1 | 11/2009 | Nassar | |
| 2010/0131538 A1 | 5/2010 | Jones et al. | |
| 2011/0066587 A1 | 3/2011 | Ferrucci et al. | |
| 2011/0125734 A1 | 5/2011 | Duboue et al. | |
| 2013/0007055 A1* | 1/2013 | Brown | F16H 1/28 707/769 |
| 2013/0018652 A1 | 1/2013 | Ferrucci et al. | |

(Continued)

OTHER PUBLICATIONS

"List of IBM Patents or Patent Applications Treated as Related", Sep. 9, 2016, 2 pages.

(Continued)

*Primary Examiner* — Anhtai V Tran
(74) *Attorney, Agent, or Firm* — Stephen J. Walder, Jr.; Diana R. Gerhardt

(57) ABSTRACT

Mechanisms are provided for evaluating a temporal relevance of a candidate answer to an input natural language question. An input natural language question is received and analyzed to identify a temporal focus of the input natural language question. A corpus of documents is processed based on the input natural language question to generate candidate answers to the input natural language question, where each candidate answer is processed to identify at least one contextual temporal focus associated with the candidate answer. The at least one contextual temporal focus is compared with the temporal focus of the input natural language question and a measure of temporal relevance of the candidate answer based on results of the comparison is generated. A final answer to the input natural language question is output based on the measure of temporal relevance.

18 Claims, 5 Drawing Sheets

(56) References Cited

U.S. PATENT DOCUMENTS

| | | |
|---|---|---|
| 2013/0066886 A1 | 3/2013 | Bagchi et al. |
| 2014/0278351 A1 | 9/2014 | Clark et al. |
| 2015/0169667 A1 | 6/2015 | Roth et al. |
| 2015/0193508 A1 | 7/2015 | Christensen et al. |
| 2015/0278264 A1 | 10/2015 | Balani et al. |
| 2015/0293917 A1 | 10/2015 | Bufe, III et al. |
| 2015/0310112 A1 | 10/2015 | Allen et al. |
| 2015/0347587 A1 | 12/2015 | Allen et al. |
| 2015/0356203 A1 | 12/2015 | Allen et al. |
| 2017/0300470 A1 | 10/2017 | Khamis et al. |

OTHER PUBLICATIONS

Filatova, Elena et al., "Assigning time-stamps to event-clauses", Proceedings of the 2001 ACL Workshop on Temporal and Spatial Information Processing—vol. 13, 2001, 8 pages.

Harabagiu, Sanda et al., "Question Answering Based on Temporal Inference", Proceedings of the AAAI-2005 Workshop on Inference for Textual Question Answering, Jul. 2005, 8 pages.

High, Rob, "The Era of Cognitive Systems: An Inside Look at IBM Watson and How it Works", IBM Corporation, Redbooks, Dec. 12, 2012, 16 pages.

Ling, Xiao, "Temporal Information Extraction", Association for the Advancement of Artificial Intelligence, vol. 10., Jul. 2010, 6 pages.

McCord, M.C. et al., "Deep parsing in Watson", IBM J, Res. & Dev. vol. 56 No. 3/4 Paper 3, May/Jul. 2012, pp. 3:1-3:15.

Pustejovsky, James et al., "Temporal and Event Information in Natural Language Text", Language Resources and Evaluation, May 2005, vol. 39, Issue 2, 42 pages.

Pustejovsky, James et al., "TimeML: Robust Specification of Event and Temporal Expressions in Text", AAAI Technical Report, SS-03-07, Spring 2003, 7 pages.

Strotgen, Jannik et al., "HeidelTime: High Quality Rule-based Extraction and Normalization of Temporal Expressions", Proceedings of the 5th International Workshop on Semantic Evaluation, ACL 2010, Uppsala, Sweden, Jul. 15-16, 2010, pp. 321-324.

Tsatsaronis, George et al., "An Overview of the Large-Scale Biomedical Semantic Indexing and Question Answering Competition", BMC Bioinformatics, 16(1), Apr. 30, 2015, 30 pages.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

EVALUATING TEMPORAL RELEVANCE IN QUESTION ANSWERING

This invention was made with United States Government support under Agreement No. 2013-12101100008. THE GOVERNMENT HAS CERTAIN RIGHTS IN THE INVENTION.

BACKGROUND

The present application relates generally to an improved data processing apparatus and method and more specifically to mechanisms for evaluating the temporal relevance of answers in a Question Answering (QA) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and a memory, the memory comprising instructions which are executed by the at least one processor to specifically configure the at least one processor to implement a Question Answering (QA) system. The method comprises receiving, by the QA system from another computing device, an input natural language question for answering by the QA system and analyzing, by the QA system, the input natural language question to identify a temporal focus of the input natural language question. The method further comprises processing, by the QA system, a corpus of documents based on the input natural language question to generate candidate answers to the input natural language question and processing, by the QA system, each candidate answer, to identify at least one contextual temporal focus associated with the candidate answer. Moreover, the method comprises comparing, by the QA system, the at least one contextual temporal focus with the temporal focus of the input natural language question and generating, by the QA system, a measure of temporal relevance of the candidate answer based on results of the comparison. Additionally, the method comprises outputting, by the QA system to the computing device, a final answer to the input natural language question based on the measure of temporal relevance.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
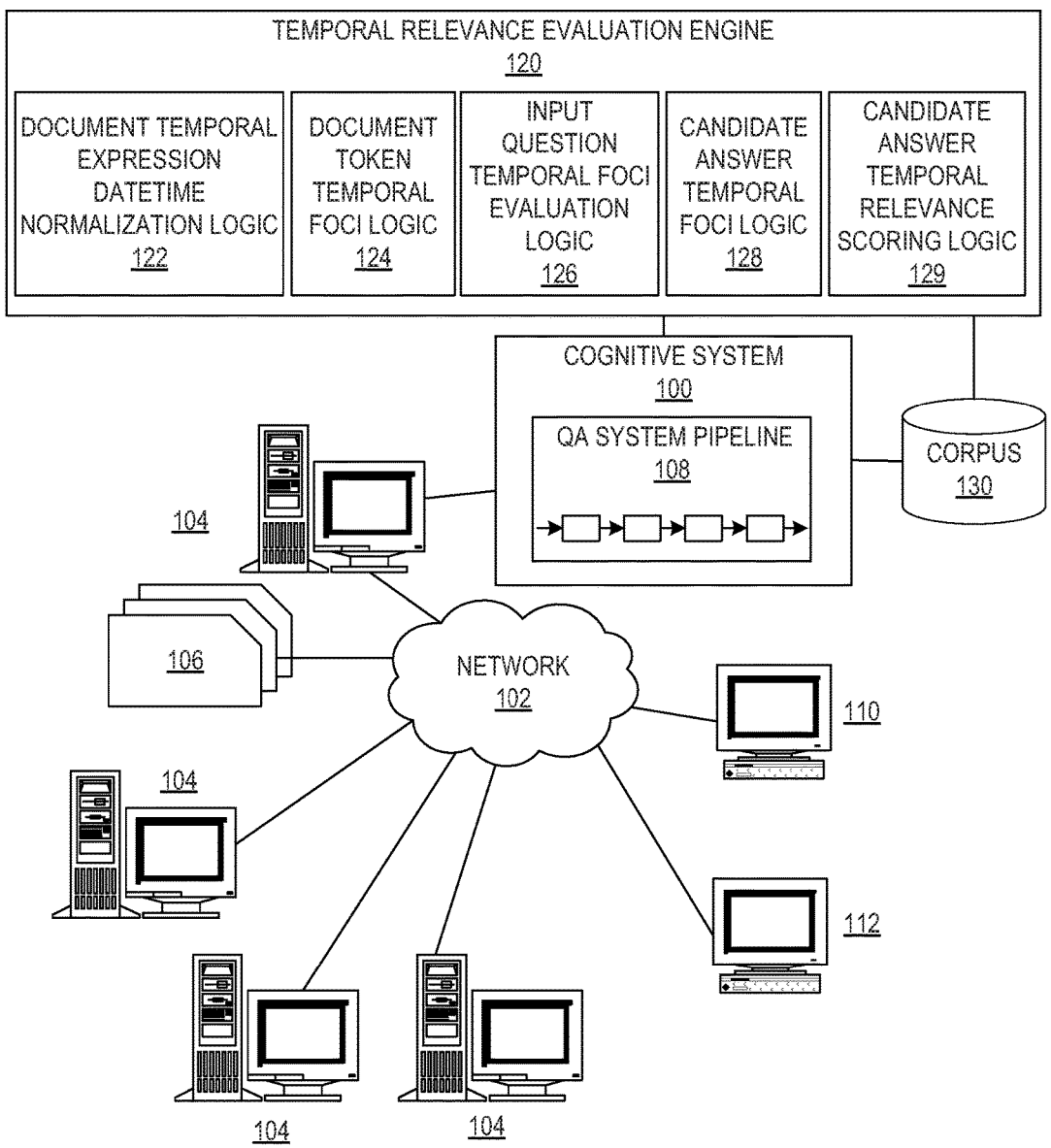
FIG. 1 depicts a schematic diagram of one illustrative embodiment of a question/answer creation (QA) system in a computer network.

The illustrative embodiments provide mechanisms for evaluating the temporal relevance of candidate answers in a question answering (QA) system. In particular, the illustrative embodiments provide mechanisms for scoring the temporal relevance of information provided in an input question to temporal information present in association with candidate answers in one or more documents of a corpus of documents, to determine which candidate answers are more temporally relevant to the input question than others.

In question answering systems, to generate answer candidates for a question, likely answers in the form of words and short phrases are extracted from a corpus of documents. These candidate answers are scored and ranked with top ranked answers being returned to the user as answers to the original question. Many questions contain time or date information which is crucial to providing a correct answer. For example, to correctly answer a question such as "Who was nominated as the Republican candidate for president in 1976?" answers which talk about both the nominee and the year 1976 should be ranked above those that talk about the nominee and the year 2000. More generally, the relationship between the temporal focus of the question and the temporal focus of the candidate answer is crucial to ranking.

For example, consider the following passage:
Ford and Reagan engaged in a bitter and close fight for the nomination during the first eight months of 1976, trading victories in a series of state Republican primaries. As the incumbent, Ford had courted wavering Republican delegates in key states by inviting them to the White House, by offering to speak in their states, and by rewarding delegates with patronage positions. Ford won the nomination on the first ballot but only by a mere sixty delegate votes.

To determine the temporal focus of the candidate answer "Ford" as being 1976 requires mechanisms that can process the entire passage and evaluate the candidate answer based on the relationship between the temporal focus of the question and the temporal focus of the candidate answer. The illustrative embodiments provide such mechanisms for evaluating temporal foci when generating answers to input questions via a cognitive system.

Within the context of the present description, the term "temporal focus" of a portion of text refers to the definite time or interval of time, often a date, time, or date/time range, which is the period for which a claim made by the text naturally applies. For example, in the text "Bill Clinton was president of the USA in 1995," the temporal focus is "1995."

The term "datetime" refers to a specification of a definite period of time, such as a year ("2015"), a day ("2015-09-01"), an hour ("2015-09-01T12"), a second ("2015-09-01T12:01:30"), or the like. These may be represented in ISO-8601 standard strings, for example. Datetimes stand in four important relations to one another: before (one datetime is before another), after (one datetime is after another), inclusion (one datetime is within the range of another datetime), and overlap (one datetime range overlaps another datetime).

The term "definite temporal expression" refers to a short phrase, e.g., "July 4", "Monday", or "yesterday", that refers to a datetime. A "corpus" or "document corpus" or "corpus of documents" refers to a set of documents which have been ingested into a cognitive system, potentially over a protracted period of time. Typically, these documents will have metadata associated with them concerning their publication date, creation date, or other temporal information. The documents will have at least a date and/or time associated with them at which point the document was ingested into the cognitive system.

The term "document" refers to any portion of content which is stored in an electronic form. A document may range from a few characters, words, or terms, to sentences, paragraphs, pages, collections of pages, and so on. A document may comprise textual and non-textual content including images, video, audio content, or the like. The document may be stored in any electronic form but in general will be stored as a portion of data which may have associated metadata.

As noted above, one aspect of a candidate answer's correctness for answering an input question is its temporal relevance to the focus of the input question, i.e. a match between the question's temporal focus and the temporal focus of the text from which the answer is extracted, also referred to herein as the contextual temporal focus of the candidate answer. In order to appropriately score candidate answers for their temporal relevance, each candidate answer extracted from a text has its contextual temporal focus determined using the mechanisms of the illustrative embodiments. The determination of a contextual temporal focus can be quite difficult since, as illustrated by the example given above, the contextual temporal focus of a candidate answer can be indicated by textual content which is quite distance from the text in which the candidate answer is present.

In accordance with one illustrative embodiment, in order to determine the contextual temporal focus of a candidate answer, the mechanisms of the illustrative embodiment first identify an appropriate document relevance datetime, such as a publication date/time, ingestion date/time, a datetime associated with a collection, source, or corpus in which the document is present, or the like, for the document. This operation may have been done prior to processing the input question, such as part of an ingestion operation or may be done as part of the processing of an input question and may be directed to a document in which the candidate answer was found, or from which it was extracted. This operation may comprise analyzing metadata associated with the document to extract dates/times that are associated with the document and then select one, if there is more than one, which is most appropriate for use as a document relevance datetime. It should be appreciated that if there is more than one date/time associated with the document, a priority or preference ordering of date/times may be established for selecting a date/time from those available. For example, a preference ordering may be established, such as via configuration information that prioritizes a publication datetime of the document over a creation datetime of the document, which is further prioritized over an ingestion datetime of the document.

The mechanisms also normalize all the definite temporal expression in the document by associating a datetime with each such expression. In other words, each temporal expression is associated with a datetime that is specified in an absolute time value and uniform format such that datetimes may be accurately compared. This is significantly different from any known mechanism since known mechanisms, if they consider temporal aspects of a document at all, generally attribute all content within a document to the temporal characteristic of the document itself, e.g., publication date. That is, known mechanisms at most consider the content of a document to be co-temporal with the document itself. Moreover, as with the determination of the document relevance datetime, this operation may be performed as part of an ingestion operation when ingesting a document from a corpus, or may be performed as part of the processing of an input question.

Furthermore, the mechanisms of this illustrative embodiment may also associate with each token in the document, e.g., word or group of alphanumeric characters, one or more temporal foci, making use of the document relevance datetime and the normalized temporal expressions associated with the portion of text in which the token is present or which is closest to the token from the standpoint of distance measured as a number of tokens (e.g., words), as well as considering other characteristics of the token and surrounding text including syntactic structure, matching verb tense between token and text corresponding to normalized temporal expressions, and the like. Again, these operations may be performed either at a time of ingestion of the document or as part of processing an input question.

In addition, the mechanisms of the illustrative embodiments determine one or more temporal foci of the input question. The identification of the one or more temporal foci may comprise using the current datetime as the relevant contextual datetime for the input question. The mechanisms may then identify and normalize all definite temporal expressions in the question with respect to this relevant contextual datetime, e.g., if the question ask about "last year" and the relevant contextual datetime of the question is 2016, then "last year" would be referring to the year "2015." These normalized datetimes of the definite temporal expressions are the temporal foci of the input question. If there are no definite temporal expressions in the input question, the current datetime may be selected for present tense questions, otherwise no datetime is selected. These operations are performed when processing the input question in response to it being received by the cognitive system of the illustrative embodiment.

The mechanisms of the illustrative embodiment may further process the input question and generate one or more candidate answers by extracting the candidate answers from the documents of the corpus. Either previously, through operation of an ingestion process in which the above operations are performed to associate datetimes with tokens in the documents, or as part of the processing of the input question, the tokens that make up the candidate answers are used to generate one or more temporal foci of the corresponding candidate answer. Thus, for example, a candidate answer may have a single word that represents the candidate answer. That word may, through the operations performed above, have a temporal focus associated with the candidate answer. If more than one temporal focus is associated with tokens of the candidate answer, then the temporal focus of the candidate answer may be generated based on a predetermined relationship evaluation of the temporal foci. In one illustrative embodiment, this may be simply a union of the temporal foci of the various tokens. In other illustrative embodiments, a more complex relationship evaluation may be performed on the temporal foci, such as a minimally overlapping datetime evaluation, and may even associate other temporal terms that cover a combination of the temporal foci, such as "before" or "after", e.g., "before 1976" the answer was X or "after last Monday" the answer is Y.

Having determined a temporal focus for the input question and a contextual temporal focus for each of the candidate answers, the candidate answers are then scored according to the temporal relevance of the candidate answer with respect to the input question. For example, in one illustrative embodiment, the candidate answer may be given a first score, e.g., a "1", if there is a datetime in the temporal focus or foci of the input question which overlaps the datetime in the temporal focus of the candidate answer (contextual temporal focus). Otherwise, if there is no overlap of this nature, then the candidate answer may be given a second score, e.g., "0". It should be appreciated that this is only one simple example. More complex scoring may be used as well based on how close the temporal foci if the input question are to the contextual temporal focus of the candidate answer such that a range of scores between the first and second scores may be assigned to a candidate answer. For example, a temporal proximity of the temporal foci of the input question to the contextual temporal focus of the candidate answer may be evaluated such that candidate answers that are more remotely proximate to the temporal foci of the input question are scored lower than those that are more closely proximate to the temporal foci of the input question. Various other metrics for scoring candidate answers with regard to temporal relevance to the input question may be used without departing from the spirit and scope of the present invention.

It should also be appreciated that the temporal focus based scoring of candidate answers may be used as part of a more complex scoring of candidate answers, such as may be performed by known or later developed cognitive systems and question answering (QA) systems. For example, the IBM Watson™ cognitive system includes a QA system which scores candidate answers based on a variety of factors. The present temporal focus based scoring may be integrated into a cognitive system and/or QA system, such as IBM Watson™ as an additional factor that is evaluated when scoring candidate answers. In such a case, various weightings may be attributed to the temporal focus based on the particular implementation. For example, in some implementations, the temporal focus may be used as a basis for essentially "ruling out" certain candidate answers, e.g., if the candidate answer's contextual temporal focus is not within the range of the temporal foci of the input question, i.e. there is no overlap of the temporal foci of the input question with the contextual temporal focus of the candidate answer, then the candidate answer may be discarded. In other implementations, the scoring of the candidate answer on the basis of the contextual temporal focus of the candidate answer may be added to the overall scoring of the candidate answer with regard to other factors in order to generate an overall score for the candidate answer for purposes of later ranking of candidate answers. This combination of scoring of various factors may be weighted according to a predetermined degree of influence of each factor over the correctness of a candidate answer such that, for example, in some implementations the contextual temporal focus evaluation may have greater influence than in other implementations.

Thus, the illustrative embodiments provide mechanism for scoring candidate answers based on the temporal relevance of the candidate answer to temporal foci of an input question. In this way, candidate answers that are more relevant to the temporal aspects of the input question may be identified such that the most relevant candidate answer may be selected as higher ranking or even final answers for responding to the input question.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
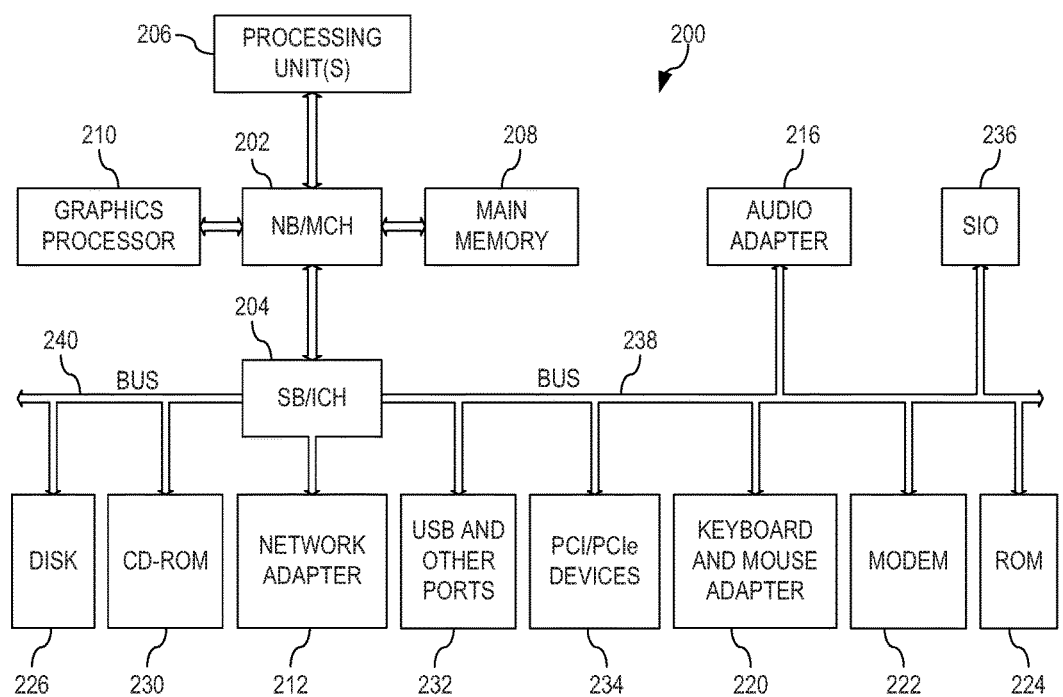
FIG. 2 is a block diagram of an example data processing system in which aspects of the illustrative embodiments are implemented.
Figure 3:
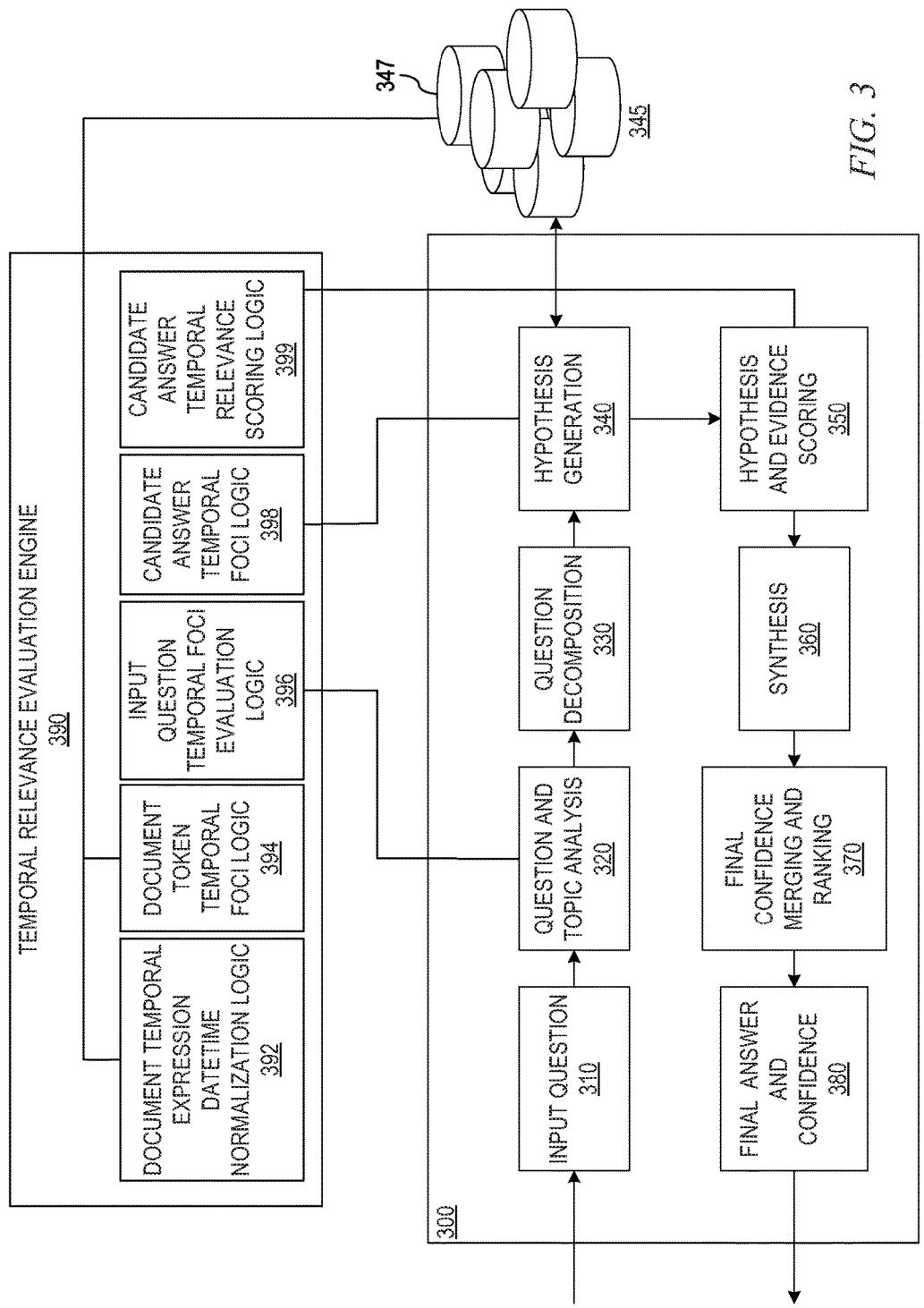
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. The QA pipeline is part of a QA system that may be implemented in the cognitive system. The cognitive system, while shown as having a single QA pipeline, may in fact have multiple QA pipelines. Each QA pipeline may be separately trained for answer input questions of a different domains or be configured to perform the same or different analysis on input questions, depending on the desired implementation. For example, in some cases, a first QA pipeline may be trained to operate on input questions in a financial domain while another QA pipeline may be trained to answer input questions in a medical diagnostics domain. Moreover, each QA pipeline may have their own associated corpus or corpora that they ingest and operate on, e.g., one corpus for financial domain documents and another corpus for medical diagnostics domain related documents in the above examples. In some cases, the QA pipelines may each operate on the same domain of input questions but may have different configurations, e.g., different annotators or differently trained annotators, such that different analysis and potential answers are generated. The QA system may provide additional logic for routing input questions to the appropriate QA pipeline, such as based on a determined domain of the input question, combining and evaluating final answers generated by multiple QA pipelines, and other control and interaction logic that facilitates the utilization of multiple QA pipelines.

As will be discussed in greater detail hereafter, the illustrative embodiments are integrated in, augment, and extend the functionality of these QA mechanisms of the cognitive system with regard to evaluating the temporal relevance of candidate answers to the temporal foci of an input question. These mechanisms extend the functionality by providing logic for identifying tokens in documents and associating with these tokens one or more temporal foci. The mechanisms further extend the functionality by identifying one or more temporal foci of the input question, associating with candidate answers a contextual temporal focus based on the temporal foci of the tokens associated with the candidate answer, and then score the candidate answers based on the relevance of the contextual temporal focus of the candidate answers to the one or more temporal foci of the input question. In this way, more temporally relevant candidate answers are ranked higher than less or non-temporally relevant candidate answers. Thus, more improved answer results are generated.

Since the present invention extends the functionality of a QA system, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson™ and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a temporal relevance evaluation engine 120. The temporal relevance evaluation engine 120 provides logic that may be utilized by the cognitive system 100 during ingestion of the documents of the corpus 130 and/or during runtime evaluation of input questions from client computing devices 110, 112, to evaluate the temporal characteristics of portions of content of the documents and associated with these portions of content metadata identifying a temporal focus or foci of the portion of content. For example, the documents may be analyzed to identify a document relevance datetime which is then used as a basis for associating a datetime with each of the definite temporal expressions in the content of the document, which is then in turn used, along with the temporal relevance datetime of the document, as a basis for associating with each token in the document a closest temporal focus or foci. Thus, each token of each document may have an associated temporal focus or foci. In addition, the temporal relevance evaluation engine 120 provides logic that analyzes an input portion of text, e.g., an input question, input search query, or the like, and identifies one or more temporal foci of the input portion of text, which for purposes of the present description will be assumed to be an input natural language question. The QA system pipeline 108 of the cognitive system 100 may then process the input question to generate candidate answers based on the corpus 130 and these candidate answers may be evaluated to identify a contextual temporal focus for each of the candidate answers. The contextual temporal focus is determined based on the temporal focus or foci of the terms in the candidate answer. The contextual temporal focus of the candidate answer is then compared to the temporal focus or foci of the input question and the candidate answer is scored based on the results of the comparison.

In order to illustrate the operation of an illustrative embodiment of the present invention, reference will be repeatedly made hereafter to an example scenario in which the input question received by the cognitive system 100 and processed by the QA system pipeline 108 is "Who was nominated as the Republican candidate for president in 1976?" In addition, the example portion of content from a document in the corpus 130 that will be used for purposes of this running example, will be the passage previously mentioned above, which will be referred to as passage P in document D:

Ford and Reagan engaged in a bitter and close fight for the nomination during the first eight months of 1976, trading victories in a series of state Republican primaries. As the incumbent, Ford had courted wavering Republican delegates in key states by inviting them to the White House, by offering to speak in their states, and by rewarding delegates with patronage positions. Ford won the nomination on the first ballot but only by a mere sixty delegate votes.

With this example in mind, as discussed previously, a set of operations are performed to associate with each of the tokens of documents in the corpus 130, a corresponding temporal focus or foci that can later be used to determine a contextual temporal focus of candidate answers that comprise those tokens. In order to generate such a temporal focus or foci for each of the tokens, the context of the tokens within the document must be evaluated and the temporal characteristics of the context must be determined. This can be done as part of an ingestion operation, such as when the corpus 130 is ingested by the cognitive system 100 for use by the QA system pipeline 108, where ingestion is a process of analyzing natural language content and generating an in-memory representation of that content. These operations can also be done on an as needed based, such as during runtime processing of an input question, e.g., in response to a candidate answer being identified in the document, the document may then be analyzed in the manner described herein to identify temporal characteristics and temporal foci associated with the candidate answer. It should be appreciated that for ease of explanation, the example above, and the following description will be provided with regard to a single document, however this process may be repeated for each document in the corpus 130 or for each document with which a candidate answer is associated.

The document temporal expression datetime normalization logic 122 performs operations for identifying an appropriate document relevance datetime for the document and normalizing all definite temporal expressions in the document by associating a datetime with each such definite temporal expression. In one illustrative embodiment, the document temporal expression datetime normalization logic 122 first identifies an appropriate document relevance datetime, such as a publication date/time, ingestion date/time, a datetime associated with a collection, source, or corpus 130 in which the document is present, or the like, for the document. This operation may comprise analyzing metadata associated with the document to extract dates/times that are associated with the document and then select one, if there is more than one, which is most appropriate for use as a document relevance datetime. If there is more than one date/time associated with the document, the document temporal expression datetime normalization logic 122 may have been configured with a priority or preference ordering of date/times to be used for selecting a date/time from those available. For example, a preference ordering may be established by configuring the document temporal expression datetime normalization logic 122 to prioritize a publication datetime of the document over a creation datetime of the document, which is further prioritized over an ingestion datetime of the document.

Thus, using the above example, passage P may be provided in document D which has a publication datetime of "1985," a creation datetime of "1983", and an ingestion datetime of "2016." This information may be present in metadata of the document D which may be analyzed by the document temporal expression datetime normalization logic 122 which then, in accordance with its configured prioritization of datetimes, selects the datetime of "1985" as the document relevance datetime for document D.

The document temporal expression datetime normalization logic 122 also normalizes all the definite temporal expression in the document D by associating a datetime with each such expression. This operation first requires the identification of definite temporal expressions within the document D. Such operations may be performed by performing a matching operation between content of the document D and a predetermined set of definite temporal expressions that are recognized by the document temporal expression datetime normalization logic 122, which may be specified as one or more tokens, words, phrases, or the like. Thus, for example, in the passage P above, the definite temporal expression that may be found is "first eight months of 1976."

The normalization performed by the document temporal expression datetime normalization logic 122 may comprise analyzing the found definite temporal expressions to determine if a particular datetime is expressly stated in the expression or if the definite temporal expression needs to be evaluated relative to the document relevance date. For example, if the definite temporal expression mentions a specific date and/or time, e.g., "1976" or "May 3, 2014", or "01:37 pm on Monday, Apr. 14, 1999", then a relative evaluation is not necessary and the specific date/time may be adopted as the datetime for the definite temporal expression. However, if the definite temporal expression is of the type "last Monday" or "next week", then those types of expressions indicate a relative measure that is relative to a datetime associated with the document itself, i.e. the document relevance datetime. Thus, in the example passage P above, the definite temporal expression "first eight months of 1976" mentions a specific date and time range, i.e. "1976" and "first eight months." The document temporal expression datetime normalization logic 122 may convert this definite temporal expression to a datetime of 1976 and/or a range of Jan. 1, 1976 to Aug. 31, 1976, depending on the particular desired implementation.

Furthermore, the document token temporal foci logic 124 also associates with each token in the document, e.g., word or group of alphanumeric characters, one or more temporal foci, making use of the document relevance datetime and the normalized temporal expressions associated with the portion of document D and/or portion of text, e.g., passage P, in which the token is present or which is closest to the token from the standpoint of distance measured as a number of tokens (e.g., words), as well as considering other characteristics of the token and surrounding text including syntactic structure, matching verb tense between token and text corresponding to normalized temporal expressions, and the like. Thus, for example, in the passage P above, each of the words, or tokens, in the passage P may have associated with it the datetime of "1976" since that is the datetime associated with the closest definite temporal expression in the passage P.

As mentioned previously, in some illustrative embodiments, the analysis performed by the logic 122-124 may be performed as part of an ingestion operation in which documents of the corpus 130 are ingested for use by the cognitive system 100 when processing an input portion of text, e.g., input question or search query. Alternatively, the operation of logic 122-124 may be performed during runtime processing of the input portion of text.

In addition, the input question temporal foci evaluation logic 126 determines one or more temporal foci of the input portion of text, e.g., input natural language question. The identification of the one or more temporal foci may comprise using the current datetime as the relevant contextual datetime for the input question. The mechanisms may then identify and normalize all definite temporal expressions in the question with respect to this relevant contextual datetime, e.g., if the question ask about "last year" and the relevant contextual datetime of the question is 2016, then "last year" would be referring to the year "2015." The normalization of the definite temporal expressions may be performed in a similar manner as described above with regard to normalization performed by the document temporal expression datetime normalization logic 122, e.g., determining if the definite temporal expression specifies a particular datetime and if not, determining if the definite temporal expression specifies a relative datetime token, word, phrase, or the like. These normalized datetimes of the definite temporal expressions are the temporal foci of the input question. If there are no definite temporal expressions in the input question, the current datetime may be selected for present tense questions, otherwise no datetime is selected. These operations are performed when processing the input question in response to it being received by the cognitive system 100 of the illustrative embodiment. Thus, for example, in the example above, the input question "Who was nominated as the Republican candidate for president in 1976?" the datetime associated with the input question is "1976" as it is expressly stated within the input question itself. A prioritized association of datetime with the input question may be utilized, such as determining if there is any datetime specified in the input question itself, determining if there is a relative datetime specified which can be evaluated against another datetime specified in the input question or against the current time, e.g., "first eight months of 1976" or "last week", using the current datetime for present tense questions, etc., as noted above.

The QA system pipeline 108 of the cognitive system 100 may further process the input question and generate one or more candidate answers by extracting the candidate answers from the documents of the corpus 130. The candidate answers may be further evaluated by the candidate answer temporal foci logic 128 and candidate answer temporal relevance scoring logic 129 working in conjunction with the QA system pipeline 108.

Either previously, through operation of an ingestion process in which the above operations are performed to associate datetimes with tokens in the documents, or as part of the processing of the input question, the tokens that make up the candidate answers are used to generate one or more temporal foci of the corresponding candidate answer. That is, the candidate answer temporal foci logic 128 takes the candidate answers generated by the QA system pipeline 108 and identifies the datetimes associated with the tokens that make up the candidate answer. Thus, for example, a candidate answer may have a single word that represents the candidate answer, e.g., in the passage P of the example above, two candidate answers may be generated such as "Ford" and "Reagan" and the datetime "1976" may be associated with both candidate answer tokens from the operation of the document token temporal foci logic 124. The word or words of the candidate answer may, through the operations performed above, be used to generate a temporal focus associated with the candidate answer. If more than one temporal foci are associated with tokens of the candidate answer, then the temporal focus of the candidate answer may be generated by the candidate answer temporal foci logic 128 based on a predetermined relationship evaluation of the temporal foci. In one illustrative embodiment, this may be simply a union of the temporal foci of the various tokens. In other illustrative embodiments, a more complex relationship evaluation may be performed on the temporal foci, such as a minimally overlapping datetime evaluation, and may even associate other temporal terms that cover a combination of the temporal foci, such as "before" or "after".

Having determined, by the input question temporal foci evaluation logic 126, a temporal focus for the input question and a contextual temporal focus for each of the candidate answers by the candidate answer temporal foci logic 128, the candidate answers are then scored by the candidate temporal relevance scoring logic 129 according to the temporal relevance of the candidate answer with respect to the input question. As noted above, in one illustrative embodiment, the candidate answer may be given a first score, e.g., a "1", if there is a datetime in the temporal focus or foci of the input question which overlaps the datetime in the temporal focus of the candidate answer (contextual temporal focus). Otherwise, if there is no overlap of this nature, then the candidate answer may be given a second score, e.g., "0". In other illustrative embodiments, a more complex scoring may be used by the candidate answer temporal relevance scoring logic 129 which is based on how close the temporal foci in the input question are to the contextual temporal focus of the candidate answer, such that a range of scores between the first and second scores may be assigned to a candidate answer. Various other metrics for scoring candidate answers with regard to temporal relevance to the input question may be used without departing from the spirit and scope of the present invention.

It should also be appreciated that the temporal focus based scoring of candidate answers, performed by the candidate answer temporal relevance scoring logic 129, may be used as part of a more complex scoring of candidate answers by the logic of the QA system pipeline 108 and/or cognitive system 100. For example, the temporal focus based scoring of the candidate answer temporal relevance scoring logic 129 may be integrated into the cognitive system 100 and/or QA system pipeline 108 as an additional factor that is evaluated when scoring candidate answers. In such a case, various weightings may be attributed to the temporal focus based on the particular implementation. For example, in some implementations, the temporal focus may be used as a basis for essentially "ruling out" certain candidate answers. In other implementations, the scoring of the candidate answer on the basis of the contextual temporal focus of the candidate answer may be added to the overall scoring of the candidate answer with regard to other factors in order to generate an overall score for the candidate answer for purposes of later ranking of candidate answers. This combination of scoring of various factors may be weighted according to a predetermined degree of influence of each factor over the correctness of a candidate answer such that, for example, in some implementations the contextual temporal focus evaluation may have greater influence than in other implementations.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive) (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 operates in conjunction with a temporal relevance evaluation engine 390 which provides logic and functionality for evaluating the temporal characteristics of documents, portions of content within documents, input questions, tokens of candidate answers, and scoring candidate answers based on the correspondence of these temporal characteristics of the input question and tokens associated with the candidate answers. It should be appreciated that while FIG. 3 shows the temporal relevance evaluation engine 390 as being a separate element from the QA system pipeline 300, in some illustrative embodiments, one or more of the elements of the temporal relevance evaluation engine 390, or the engine 390 as a whole, may be integrated into the QA system pipeline 300 as an additional stage or as additional logic added to one or more of the individual stages 310-380 of the QA system pipeline 300, without departing from the spirit and scope of the present invention. For example, in one illustrative embodiment, the input question temporal foci evaluation logic 396 may be integrated into the question and topic analysis stage logic 320, the candidate answer temporal foci logic 398 may be integrated into the hypothesis generation stage logic 340, and the candidate answer temporal relevance scoring logic 399 may be integrated into the hypothesis and evidence scoring stage logic 350.

The document temporal expression datetime normalization logic 392 and document token temporal foci logic 394, which perform the operations and provide the logic as discussed above with regard to elements 122 and 124 in FIG. 1, may operate as part of a pre-processing operation that operates on the contents of documents of the corpus or corpora 345, 347 prior to the QA system pipeline 300 utilizing the content of these documents to answer questions submitted to the QA system pipeline 300. Thus, as part of an ingestion operation, in addition to the various analysis and annotation performed by the mechanisms of the cognitive system and QA system discussed above to generate an in-memory representation of the documents of the corpus or corpora 345, 347, the additional processing discussed previously with regard to elements 122 and 124 may be performed by the document temporal expression datetime normalization logic 392 and document token temporal foci logic 394 to associate with tokens in the content datetimes based on evaluations of document relevance datetimes, definite temporal expressions, and identifying a closest definite temporal expression to the token that is used to associate its temporal focus or foci with the token. Thus, each token in the content of a document will have its own associated temporal focus or foci. Alternatively, as mentioned above, these processes may be performed during realtime in response to an input question being received by the QA system pipeline 300 and may be done with regard to a specific document associated with a candidate answer identified through the processing of the QA system pipeline 300.

In addition, in response to the QA system pipeline 300 receiving an input question and performing its initial processing of the input question via stages 310 and 320, the input question, or the results of the processing of the input question via stage 320, is provided to the input question temporal foci evaluation logic 396 which performs operations similar to that described above with regard to element 126 of FIG. 1. That is, the input question temporal foci evaluation logic 396 operates to determine one or more temporal foci of the input natural language question. As discussed previously, this may involve identifying one or more temporal foci using the current datetime as the relevant contextual datetime for the input question and identifying and normalizing all definite temporal expressions in the question with respect to this relevant contextual datetime. This identification and normalization may comprise determining if the question itself specifies a particular datetime and if not, whether the input question comprises a definite temporal expression that is a relative definite temporal expression that can be evaluated relative to the relevant contextual datetime of the input question. If there are no definite temporal expressions in the input question, the verb tense of the input question may be evaluated to determine if the input question is presented in present tense in which case the current datetime may be selected as the temporal focus of the input question; otherwise no datetime is selected.

These operations of input question temporal foci evaluation logic 396 may be performed in parallel with the operations of stages 320-340 which perform their operations for generating a set of candidate answers to the input question. The candidate answers generated, for example by hypothesis generation stage logic 340 of the QA system pipeline 300, may be further evaluated by the candidate answer temporal foci logic 398 and candidate answer temporal relevance scoring logic 399 working in conjunction with the QA system pipeline 300.

As noted above, either previously, through operation of an ingestion process in which the above operations are performed to associate datetimes with tokens in the documents, or as part of the processing of the input question, the tokens that make up the candidate answers generated by the hypothesis generation stage logic 340 are used by the candidate answer temporal foci logic 398 to generate one or more temporal foci of the corresponding candidate answer. That is, the candidate answer temporal foci logic 398 takes the candidate answers generated by the hypothesis generation stage logic 340 and identifies the datetimes associated with the tokens that make up the candidate answer. The temporal foci of the tokens of the candidate answer are then evaluated to generate a single contextual temporal focus of the candidate answer, such as by way of performing a union of the temporal foci of the various tokens of the candidate answer or performing a more complex relationship evaluation of the foci of the tokens, as discussed previously. The result is that each candidate answer identified by the hypothesis generation stage logic 340 is associated with a corresponding contextual temporal focus by the candidate answer temporal foci logic 398. Moreover, the input question has its own set of one or more temporal foci as determined by the input question temporal foci evaluation logic 396.

Having determined a temporal focus or foci for the input question and a contextual temporal focus for each of the candidate answers, the candidate answers are then scored by the candidate temporal relevance scoring logic 399 according to the temporal relevance of the candidate answer with respect to the input question. That is, a score is attributed to each candidate answer based on the relationship of its corresponding contextual temporal focus with the one or more temporal foci of the input question. A range of scores may be established such that a highest score indicates an exact match between the contextual temporal focus of the candidate answer and the temporal focus or foci of the input question, and a lowest score indicates a complete mis-match between the contextual temporal focus of the candidate answer and the temporal focus or foci of the input question. A complete mis-match may be measured in many different ways, e.g., being outside a datetime range of the temporal focus or foci of the input question.

As noted above, in one illustrative embodiment, the candidate answer may be given a first score, e.g., a "1", if there is a datetime in the temporal focus or foci of the input question which overlaps the datetime in the temporal focus of the candidate answer (contextual temporal focus). Otherwise, if there is no overlap of this nature, then the candidate answer may be given a second score, e.g., "0". In other illustrative embodiments, a more complex scoring may be used by the candidate answer temporal relevance scoring logic 399 which is based on how close the temporal foci in the input question are to the contextual temporal focus of the candidate answer, such that a range of scores between the first and second scores may be assigned to a candidate answer. Thus, for example, if the contextual temporal focus is only a month or two before the timeframe represented by the temporal focus of the input question, then the score for the candidate answer may be relatively higher than a candidate answer whose contextual temporal focus is many years before or after the temporal focus of the input question.

Thus, the candidate answer temporal relevance scoring logic 399 generates a temporal relevance scoring of the candidate answers based on each candidate answers's temporal relevance to the input question. These temporal relevance scores may be provided to the hypothesis and evidence scoring stage logic 350 for use in a more complex scoring of candidate answers that performs scoring based on evidence passages in the corpus or corpora 345, 347 as well as the temporal relevance scoring. In some illustrative embodiments candidate answers that are determined by the candidate answer temporal relevance scoring logic 399 to have no temporal relevance may in fact be eliminated from further evaluation by the logic of the QA system pipeline 300. Thus, the temporal scores associated with candidate answers generated by the hypothesis generation stage logic 340 may be used to prune the set of candidate answers prior to further evidential evaluation by the hypothesis and evidence scoring stage logic 350. In other illustrative embodiments, the temporal scores associated with candidate answers may be used as a weight to be applied to the evidence scores generated by the hypothesis and evidence scoring stage logic 350 such that candidate answers that are determined to be more temporally relevant to the input question are weighted more heavily than candidate answers that are not as temporally relevant. Alternatively, in other illustrative embodiments, the temporal scores of candidate answers may be simply another scoring factor that is weighted according to its determined relative influence on the correctness of candidate answers, which is then combined with the weighted scores of other evidence from the corpus or corpora 345, 347, to generate an overall confidence score for the candidate answers. Any mechanism for integrating the temporal relevance scoring into an overall scoring of candidate answers may be used without departing from the spirit and scope of the present invention.

Thereafter, the operation of the QA system pipeline 300 is essentially the same as already discussed above. That is, the synthesis stage logic 360, final confidence merging and ranking stage logic 370, and final answer and confidence stage logic 380 operate to rank the candidate answers according to their confidence scores, which includes the temporal scoring discussed above, and select one or more final answers to be returned as answers to the input question. Thus, temporal relevance is evaluated using the mechanisms of the illustrative embodiments to provide more accurate evaluations of candidate answers.

Figure 4:
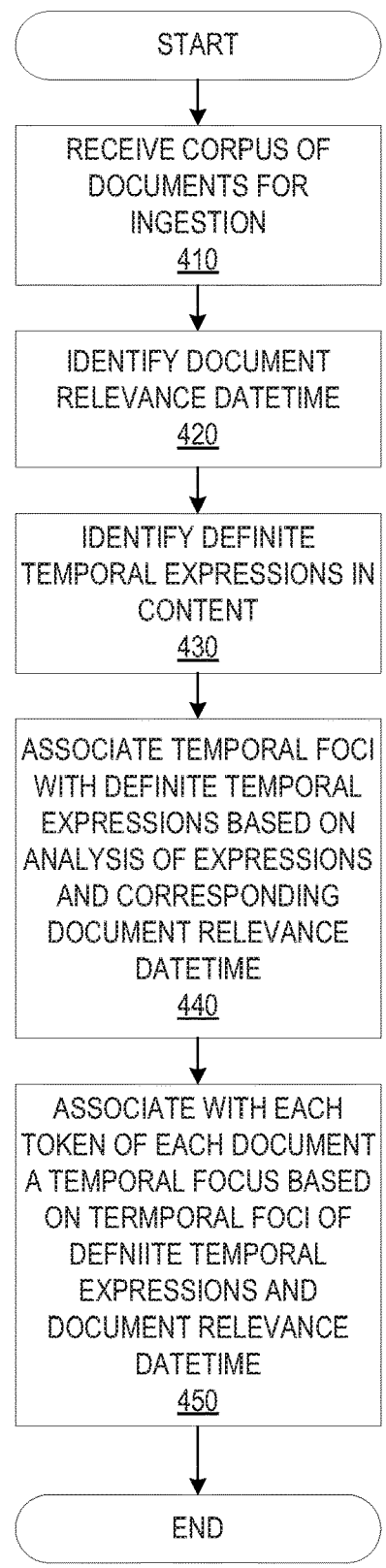
FIG. 4 is a flowchart outlining an example operation for ingesting documents of a corpus and associating datetimes with tokens in the documents in accordance with one illustrative embodiment.

FIG. 4 is a flowchart outlining an example operation for ingesting documents of a corpus and associating datetimes with tokens in the documents in accordance with one illustrative embodiment. The operation outlined in FIG. 4 is shown for an embodiment in which the operations are part of a pre-processing or ingestion of documents of a corpus for use with a cognitive system. That is, the operations in FIG. 4 may be performed prior to handling a cognitive operation request, such as the input of a natural language question or search query, for example. It should be appreciated that minor adjustments to the operation shown in FIG. 4 may be made to perform similar operations during runtime processing of a cognitive operation request, such as with regard to a document or portion of content associated with a potential result of the cognitive operation, e.g., a candidate answer to an input question or a candidate search result for a search query.

The operation outlined in FIG. 4 may be performed, for example, by the document temporal expression datetime normalization logic 122, 392 and document token temporal foci logic 124, 394, for example. As shown in FIG. 4, the operation starts by receiving a corpus of documents for ingestion (step 410). A document relevance datetime for each of the documents is identified (step 420), such as by processing metadata associated with each of the documents. As noted above, this document relevance datetime may be a publication date/time, creation date/time, ingestion date/time, or the like. Definite temporal expressions in content of the documents are identified (step 430) and a temporal focus of foci is associated with each of the identified definite temporal expressions based on analysis of expressions and corresponding document relevance datetimes (step 440). Thereafter, each of the tokens in the documents are identified and associated with a closest definite temporal expression, if any, such that the corresponding temporal focus or foci may be associated with the token (step 450). Alternatively, the document relevance datetime may be used to associate a temporal focus or foci with the tokens if there is no closest definite temporal expression. The temporal foci associated with the tokens is stored in association with the tokens in the in-memory representation of the documents of the corpus for further use by the cognitive system when performing cognitive operations, such as question answering, cognitive searching of the corpus, or the like.

Figure 5:
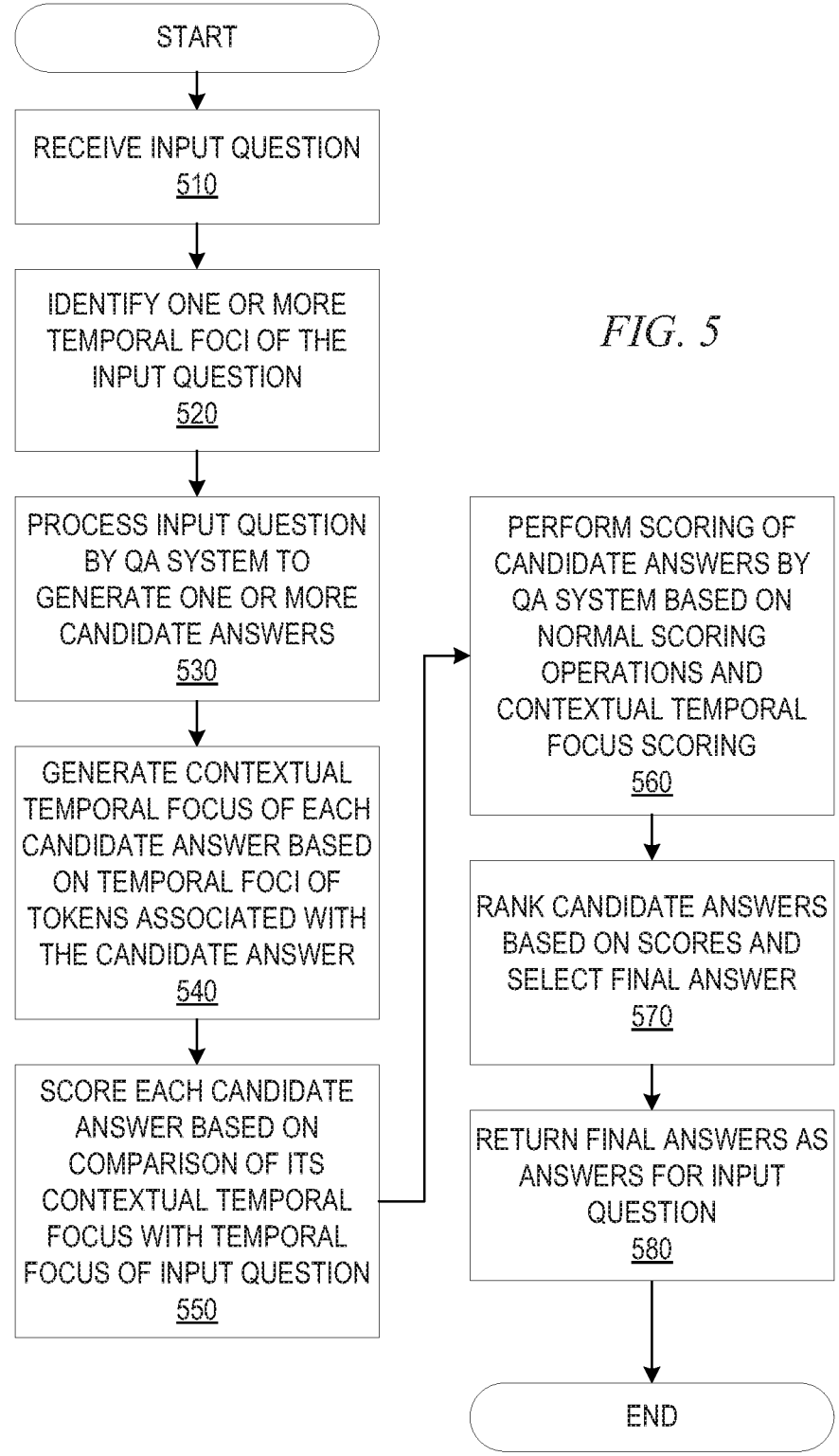
FIG. 5 is a flowchart outlining an example operation for evaluating candidate answers to an input question based on a temporal focus of the input question and contextual temporal foci of candidate answers in accordance with one illustrative embodiment.

FIG. 5 is a flowchart outlining an example operation for evaluating candidate answers to an input question based on a temporal focus of the input question and contextual temporal foci of candidate answers in accordance with one illustrative embodiment. While the flowchart shown in FIG. 5 is for processing an input natural language question, it should be appreciated that modifications to the operation of FIG. 5 may be made to apply similar operations to other types of cognitive system inputs to perform other types of cognitive operations, such as cognitive searches of natural language content provided in documents of a corpus based on a search query, cognitive evaluations of patient medical records by a cognitive system employing a patient registry which is searched in accordance with a cognitive request, e.g., diagnosis request, patient evaluation with regard to specific criteria, or the like.

As shown in FIG. 5, the operation starts by receiving an input question (step 510) and one or more temporal foci of the input question are identified (step 520). This may be performed, for example, by the input question temporal foci evaluation logic 126, 396 in FIGS. 1 and 3. The input question is processed by the QA system to generate one or more candidate answers (step 530). A contextual temporal focus is determined for each candidate answer based on the temporal foci of the tokens associated with the candidate answer (step 540). This may be performed, for example, by the candidate answer temporal foci logic 128, 398.

The candidate answers are then each scored according to results of a comparison of the contextual temporal focus of the candidate answer and the temporal focus or foci of the input question (step 550). This temporal scoring may be performed, for example, by the candidate answer temporal relevance scoring logic 129, 399. The temporal scoring is then combined with the scoring of candidate answers based on evidential basis to generate a confidence score for each candidate answer (step 560). The candidate answers are then ranked according to the confidence scores of the candidate answers, including the temporal scoring, and one or more final answers to the input question are selected (step 570). The selected final answer(s) are then returned as answers to the input question (step 580). The operation then terminates.

It should be appreciated that while the above illustrative embodiments have been described in the context of a QA system answering an input question, the illustrative embodiments are not limited to such. Rather the illustrative embodiments may be implemented in any cognitive system that processes requests based on documents in a corpus of documents using cognitive logic processes. For example, the illustrative embodiments may be utilized in a cognitive search engine where, rather than an input question, a search query may be input and the search query may be processed to identify temporal foci with search results being returned and evaluated by the mechanisms of the illustrative embodiments to identify a contextual temporal focus of the search results, which are then scored and ranked in accordance with the mechanisms of the illustrative embodiments as described above. Other cognitive systems based on natural language processing of documents or other content may also be augmented with the mechanisms of the illustrative embodiments to evaluate portions of text with regard to a temporal relevance to a particular input, e.g., patient electronic record evaluation systems, cognitive law enforcement systems, or the like. Any cognitive system that analyzes textual content may be augmented to include the temporal relevance evaluation logic of the illustrative embodiments to evaluate the relevance of one portion of text to another portion of text, without departing from the spirit and scope of the present invention.

As discussed above, while the example embodiments set forth in the Figures and described herein a primarily directed to the answering of natural language input questions using a corpus or corpora of natural language documents, the illustrative embodiments are not limited to such and any cognitive system performing cognitive operations may make use of the mechanisms of the illustrative embodiments to determine a temporal relevance of results to an initial request. For example, with regard to a cognitive system that operates as a cognitive search engine, rather than an input natural language question being processed, an input of a natural language search query may be received and processed by the cognitive search engine so as to return search results that are most relevant to the search query. The operations of the illustrative embodiments may be used to process the input search query to identify a temporal focus or foci of the search query and then compare contextual temporal foci of potential search results, found by performing keyword searching and the like, with the temporal foci of the input search query. The ranking of potential search results may then be made based on a scoring of the potential search results both with regard to a degree of matching of the keywords of the search query as well as the temporal relevance of the search results to the search query as determined from the comparison of temporal foci and contextual temporal foci.

For example, the search query may be of the type "news stories about bankruptcy filings in the last month." The search query may be analyzed using the mechanisms of the illustrative embodiments to determine that the focus or foci of the input search query is a range of datetimes from the current datetime back one month. The search query may be evaluated to identify search results matching the keywords or criteria of the search query, e.g., portions of content that are new stories that discuss bankruptcy filings. The temporal focus or foci of the input search query may be evaluated against the contextual temporal focus of potential search results to score them according to their temporal relevance to the input search query, rank them, and return a ranked set of search results.

In other cognitive systems, such as a patient medical records evaluation system, the input query may represent a particular request to diagnose the patient, find patients with certain types of diagnoses, find patients with certain characteristics, and the like, that are tied to a temporal focus or foci. For example, the initial request may be posed as a search request or as an input question and may specify the criteria for finding results and the temporal focus or foci of the request. An example may be of the type, "what patients had diagnosis in the last year that indicated diabetes?" Such a request may be processed using the mechanisms of the illustrative embodiments in the manner previously described above.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and a memory, the memory comprising instructions which are executed by the at least one processor to specifically configure the at least one processor to implement a Question Answering (QA) system, the method comprising:

receiving, by the QA system from another computing device, an input natural language question for answering by the QA system;

analyzing, by the QA system, the input natural language question to identify a temporal focus of the input natural language question;

processing, by the QA system, a corpus of documents based on the input natural language question to generate candidate answers to the input natural language question;

processing, by the QA system, each candidate answer, to identify at least one contextual temporal focus associated with the candidate answer;

comparing, by the QA system, the at least one contextual temporal focus with the temporal focus of the input natural language question;

generating, by the QA system, a measure of temporal relevance of the candidate answer based on results of the comparison; and outputting, by the QA system to the computing device, a final answer to the input natural language question based on the measure of temporal relevance, wherein comparing the at least one contextual temporal focus with the temporal focus of the input natural language question comprises generating a score for the candidate answer based on a determined temporal proximity between the at least one contextual temporal focus and the temporal focus of the input natural language question.

2. The method of claim 1, further comprising analyzing the documents of the corpus, wherein analyzing the documents of the corpus comprises, for each document:
   determining a document relevance datetime of the document based on at least one of metadata or content of the document, wherein the document relevance datetime applies to all content of the document; and
   associating, with each definite temporal expression in content of the document, a datetime with the definite temporal expression, and wherein the at least one contextual temporal focus of a candidate answer generated based on a definite temporal expression in the content of the document is identified based on at least one of the document relevance datetime or the datetime of the definite temporal expression.

3. The method of claim 2, wherein analyzing the documents of the corpus further comprises, for each document:
   associating with each token in the content of the document, a datetime based on a document relevance datetime associated with the document and a datetime associated with a definite temporal expression that is closest to the token in the document, and wherein the at least one contextual temporal focus of the candidate answer generated based on the definite temporal expression in the content of the document is identified based on the datetime of tokens in the candidate answer.

4. The method of claim 3, wherein the at least one contextual temporal focus of the candidate answer is identified based on the datetime of tokens in the candidate answer by combining datetimes of the tokens in the candidate answer according to a predetermined relationship.

5. The method of claim 4, wherein the predetermined relationship is one of a union of datetimes of tokens in the candidate answer or a minimally overlapping datetime evaluation.

6. The method of claim 2, wherein determining a document relevance datetime of the document comprises determining the document relevance datetime in accordance with an established prioritization of a plurality of types of relevance datetimes.

7. The method of claim 2, wherein the analyzing of the documents is done as part of an ingestion operation for ingesting the corpus prior to receipt of the input natural language question.

8. The method of claim 1, wherein analyzing the input natural language question to identify a temporal focus of the input natural language question comprises determining a current datetime and normalizing definite temporal expressions in the input natural language question relative to the current datetime.

9. The method of claim 1, wherein comparing the at least one contextual temporal focus with the temporal focus of the input natural language question comprises generating a score for the candidate answer based on a determined amount of overlap of the at least one contextual temporal focus and the temporal focus of the input natural language question.

10. A computer program product comprising a computer readable storage medium having a computer readable program stored therein, wherein the computer readable program, when executed on a computing device, causes the computing device to:
    receive an input natural language question for answering by the QA system;
    analyze the input natural language question to identify a temporal focus of the input natural language question;
    process a corpus of documents based on the input natural language question to generate candidate answers to the input natural language question;
    process each candidate answer to identify at least one contextual temporal focus associated with the candidate answer;
    compare the at least one contextual temporal focus with the temporal focus of the input natural language question;
    generate a measure of temporal relevance of the candidate answer based on results of the comparison; and
    output a final answer to the input natural language question based on the measure of temporal relevance, wherein comparing the at least one contextual temporal focus with the temporal focus of the input natural language question comprises generating a score for the candidate answer based on a determined temporal proximity between the at least one contextual temporal focus and the temporal focus of the input natural language question.

11. The computer program product of claim 10, wherein the computer readable program further causes the computing device to analyze the documents of the corpus, wherein analyzing the documents of the corpus comprises, for each document:
    determining a document relevance datetime of the document based on at least one of metadata or content of the document, wherein the document relevance datetime applies to all content of the document; and
    associating, with each definite temporal expression in content of the document, a datetime with the definite temporal expression, and wherein the at least one contextual temporal focus of a candidate answer generated based on a definite temporal expression in the content of the document is identified based on at least one of the document relevance datetime or the datetime of the definite temporal expression.

12. The computer program product of claim 11, wherein analyzing the documents of the corpus further comprises, for each document:
    associating with each token in the content of the document, a datetime based on a document relevance datetime associated with the document and a datetime associated with a definite temporal expression that is closest to the token in the document, and wherein the at least one contextual temporal focus of the candidate answer generated based on the definite temporal expression in the content of the document is identified based on the datetime of tokens in the candidate answer.

13. The computer program product of claim 12, wherein the at least one contextual temporal focus of the candidate answer is identified based on the datetime of tokens in the candidate answer by combining datetimes of the tokens in the candidate answer according to a predetermined relationship.

14. The computer program product of claim 13, wherein the predetermined relationship is one of a union of datetimes of tokens in the candidate answer or a minimally overlapping datetime evaluation.

15. The computer program product of claim 11, wherein the computer readable program further causes the computing device to determine a document relevance datetime of the document at least by determining the document relevance datetime in accordance with an established prioritization of a plurality of types of relevance datetimes.

16. The computer program product of claim 11, wherein the analyzing of the documents is done as part of an ingestion operation for ingesting the corpus prior to receipt of the input natural language question.

17. The computer program product of claim 10, wherein the computer readable program further causes the computing device to analyze the input natural language question to identify a temporal focus of the input natural language question at least by determining a current datetime and normalizing definite temporal expressions in the input natural language question relative to the current datetime.

18. An apparatus comprising:
a processor; and
a memory coupled to the processor, wherein the memory comprises instructions which, when executed by the processor, cause the processor to:
receive an input natural language question for answering by the QA system;
analyze the input natural language question to identify a temporal focus of the input natural language question;
process a corpus of documents based on the input natural language question to generate candidate answers to the input natural language question;
process each candidate answer to identify at least one contextual temporal focus associated with the candidate answer;
compare the at least one contextual temporal focus with the temporal focus of the input natural language question;
generate a measure of temporal relevance of the candidate answer based on results of the comparison; and
output a final answer to the input natural language question based on the measure of temporal relevance, wherein comparing the at least one contextual temporal focus with the temporal focus of the input natural language question comprises generating a score for the candidate answer based on a determined temporal proximity between the at least one contextual temporal focus and the temporal focus of the input natural language question.

* * * * *